(12) United States Patent
Zhong (10) Patent No.: US 10,662,998 B2
(45) Date of Patent: May 26, 2020

(54) SLEEVE FOR DEEP GROOVE BALL BEARING

(71) Applicant: Schaeffler Technologies AG & Co. KG, Herzogenaurach (DE)

(72) Inventor: Guihui Zhong, Charlotte, NC (US)

(73) Assignee: Schaeffler Technologies AG & CO, KG, Herzogenaurach (DE)

( * ) Notice: Subject to any disclaimer, the term of this patent is extended or adjusted under 35 U.S.C. 154(b) by 0 days.

(21) Appl. No.: 16/101,937

(22) Filed: Aug. 13, 2018

(65) Prior Publication Data

US 2020/0049194 A1 Feb. 13, 2020

(51) Int. Cl.
| | |
|---|---|
| F16C 19/04 | (2006.01) |
| F16C 25/08 | (2006.01) |
| F16C 33/50 | (2006.01) |
| F16C 35/077 | (2006.01) |
| H02K 5/16 | (2006.01) |
| F16C 19/16 | (2006.01) |
| F16C 33/58 | (2006.01) |

(52) U.S. Cl.
CPC .......... *F16C 19/16* (2013.01); *F16C 33/508* (2013.01); *F16C 33/585* (2013.01); *F16C 35/077* (2013.01); *F16C 25/08* (2013.01); *F16C 25/083* (2013.01); *F16C 33/586* (2013.01); *H02K 5/16* (2013.01)

(58) Field of Classification Search
CPC ........ F16C 19/06; F16C 19/16; F16C 19/525; F16C 25/08; F16C 25/083; F16C 27/045; F16C 33/508; F16C 33/585; F16C 35/077; F16C 2202/08; F16C 2229/00; F16F 15/0237; H02K 5/1732; H02K 5/16

USPC .............. 385/215, 513, 535, 537, 561, 581; 403/29, 220, 371; 384/215, 513, 535, 384/537, 561, 581
See application file for complete search history.

(56) References Cited

U.S. PATENT DOCUMENTS

| | | | | |
|---|---|---|---|---|
| 2,506,404 A | * | 5/1950 | Morton | F16C 23/04 384/535 |
| 2,534,142 A | * | 12/1950 | Morton | F16C 27/04 384/535 |
| 3,467,451 A | * | 9/1969 | Marley | F16C 27/02 384/215 |
| 4,772,139 A | * | 9/1988 | Bretton | F16C 27/04 384/535 |
| 5,028,152 A | | 7/1991 | Hill et al. | |
| 5,059,042 A | * | 10/1991 | Grierson | F16C 27/04 384/537 |

(Continued)

FOREIGN PATENT DOCUMENTS

| | | | |
|---|---|---|---|
| DE | 102012222802 A1 | 6/2014 | |
| GB | 647187 A | * 12/1950 | F16C 27/04 |

*Primary Examiner* — Marcus Charles (74) *Attorney, Agent, or Firm* — Volpe and Koenig, P.C.

(57) ABSTRACT

A deep groove ball bearing assembly is disclosed. The assembly includes an inner bearing ring defining an inner race, an outer bearing ring defining an outer race, and a plurality of rolling elements supported on the inner race and the outer race. A shaft is supported on a radially inner surface of the inner bearing ring, and a housing is supported on a radially outer surface of the outer bearing ring. A sleeve is arranged between the radially outer surface of the outer bearing ring and a radially inner surface of the housing, and the sleeve includes a plurality of through openings.

16 Claims, 8 Drawing Sheets

(56) References Cited

U.S. PATENT DOCUMENTS

| | | | | |
|---|---|---|---|---|
| 7,628,542 B2* | 12/2009 | Wada | ................... | F16F 15/0237 |
| | | | | 384/535 |
| 8,157,450 B2* | 4/2012 | Hosmer | ................ | F16C 23/084 |
| | | | | 384/535 |
| 8,284,523 B2* | 10/2012 | Schmidt | ................ | F16C 35/077 |
| | | | | 360/265.6 |
| 8,337,090 B2 | 12/2012 | Herborth et al. | | |
| 8,684,608 B2 | 4/2014 | Ince et al. | | |
| 8,851,759 B2* | 10/2014 | Bussit | ..................... | F16C 19/06 |
| | | | | 384/536 |
| 9,103,369 B2* | 8/2015 | Krug | ..................... | F16C 19/364 |
| 9,611,887 B2* | 4/2017 | Churchley | ............ | F16C 35/077 |
| 9,702,265 B2* | 7/2017 | Arghir | ................. | F16C 35/077 |
| 2009/0080824 A1 | 3/2009 | Joki et al. | | |
| 2012/0093453 A1 | 4/2012 | Horvat | | |

* cited by examiner

SLEEVE FOR DEEP GROOVE BALL BEARING

FIELD OF INVENTION

The present invention relates to a deep groove ball bearing.

BACKGROUND

Deep groove ball bearings are well known, particularly in the automotive field. Deep groove ball bearings are used in automotive transmissions, especially for continuously variable transmissions or hybrid transmission or e-axles. These known types of bearings experience creep due to high speed and heavy loads. In particular, the outer bearing ring experiences creep, which causes fretting and wear in the outer housing, typically formed from aluminum. Known solutions for addressing bearing creep include applying a coating to the bearing components, or require the use of an angular contact bearing with a biasing element to provide a preload. These solutions are relatively expensive and require additional assembly steps and handling.

Known solutions for addressing creep or thermal expansion of bearing assemblies are disclosed in US Pub 2012/0093453; U.S. Pat. Nos. 8,684,608; 5,028,152; and US Pub. 2009/0080824.

It would be desirable to provide a cost-effective solution for addressing fretting and wear in deep groove ball bearings that does not affect load capacity and is relatively simple to assemble.

SUMMARY

A deep groove ball bearing assembly including a sleeve to prevent fretting and wear is disclosed. The assembly includes an inner bearing ring defining an inner race, an outer bearing ring defining an outer race, and a plurality of rolling elements supported on the inner race and the outer race. A shaft is supported on a radially inner surface of the inner bearing ring, and a housing is supported on a radially outer surface of the outer bearing ring. The sleeve is arranged between the radially outer surface of the outer bearing ring and a radially inner surface of the housing, and the sleeve includes a plurality of through openings.

The sleeve alters a contact interface between the housing and the outer bearing ring to reduce or eliminate creep.

The sleeve can either be a split ring or a closed ring.

The sleeve can be formed as a deep-drawn stamped component.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1A:
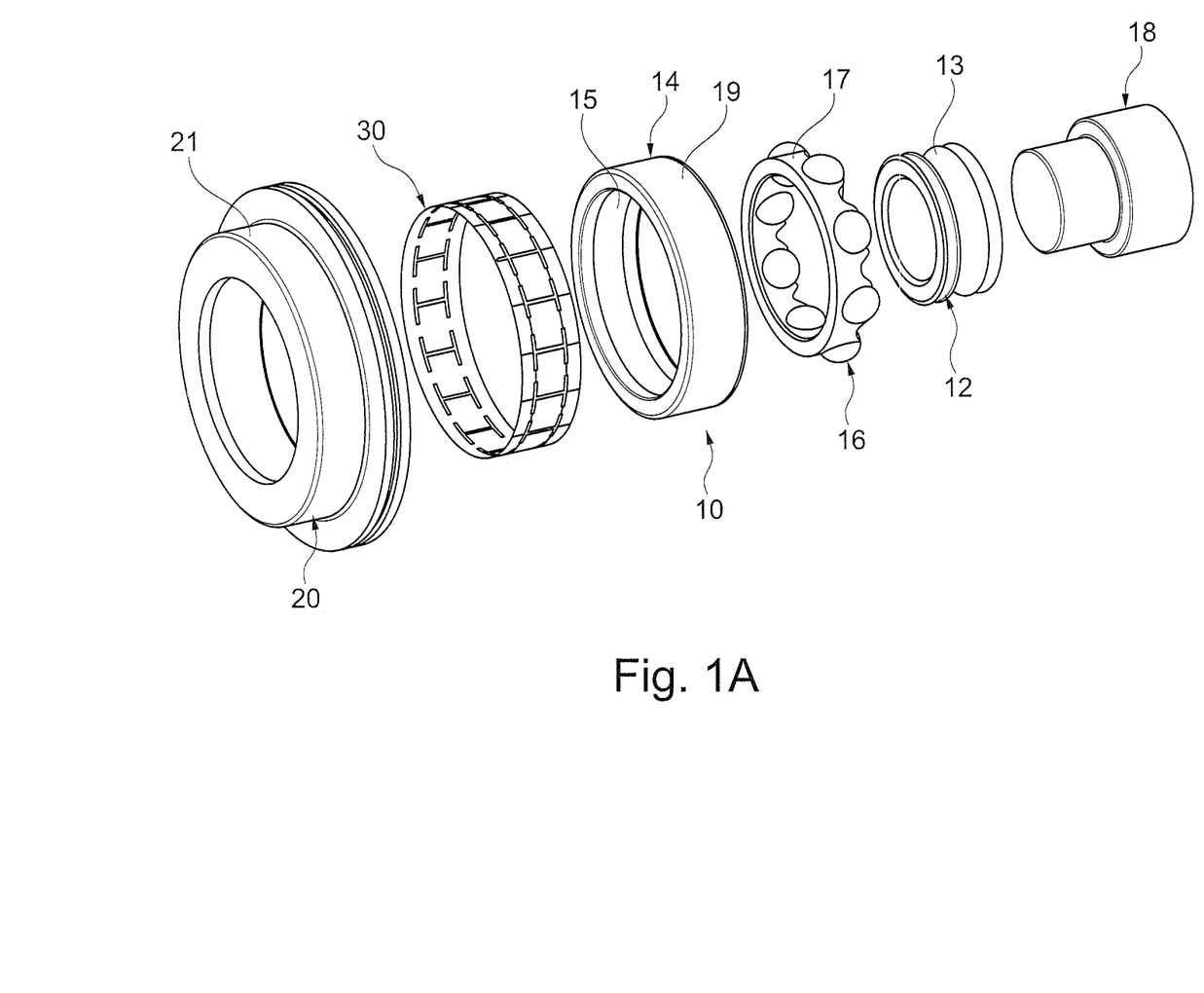
FIG. 1A is a perspective exploded view of a deep groove ball bearing including a sleeve.

As shown in FIG. 1A, a deep groove ball bearing assembly 10 is disclosed. The assembly 10 includes an inner bearing ring 12 defining an inner race 13, an outer bearing ring 14 defining an outer race 15, and a plurality of rolling elements 16 supported on the inner race 13 and the outer race 15. In one embodiment, the rolling elements 16 are spherical rolling elements. In one embodiment, the rolling elements 16 are supported by a cage 17. One of ordinary skill in the art would understand that the rolling elements 16 can be modified according to a particular application. One of ordinary skill in the art would also understand that the cage 17 can be omitted. A shaft 18 is supported on a radially inner surface of the inner bearing ring 12, and a housing 20 is supported on a radially outer surface 19 of the outer bearing ring 14. In one embodiment, the housing 20 is formed from aluminum, while the bearing rings 12 14 are formed from bearing grade steel.

A sleeve 30, shown in various views in greater detail in FIGS. 1C-1F, is arranged between the radially outer surface 19 of the outer bearing ring and a radially inner surface 21 of the housing 20. The sleeve 30 includes a plurality of through openings 32. In one embodiment, the through openings 32 are spaced along an entire circumferential extent of the sleeve 30. In one embodiment, there are at least fourteen through openings 32. In one embodiment, the sleeve 30 is a closed ring, i.e. the sleeve 30 extends circumferentially for 360 degrees. One of ordinary skill in the art would understand that the exact configuration of the through openings 32 can be varied.

In one embodiment, the sleeve 30 is a deep-drawn stamped sleeve. The sleeve 30 is preferably formed from sheet metal. In one embodiment, the sleeve 30 is wrapped around a respective contact surface of the assembly 10 and then welded closed. The sleeve 30 can also be heat treated to provide increased strength. In one embodiment, the sleeve 30 has a thickness of 0.1 mm-1.0 mm. One of ordinary skill in the art would understand that the thickness of the sleeve 30 can be varied depending on a specific application.

In one embodiment, each through opening 32 includes a pair of circumferentially extending slots 34a, 34b connected by an axially extending slot 34c. As shown most clearly in FIG. 1E, the through opening 32 has a generally H-shaped profile.

In one embodiment, the sleeve 30 includes a plurality of grooves 36a, 36b, 38a, 38b. The plurality of grooves 36a, 36b, 38a, 38b can include a first plurality of grooves 36a, 36b extending circumferentially to connect adjacent through openings 32, and a second plurality of grooves 38a, 38b extending axially to connect axially outermost edges of the sleeve 39a, 39b and the plurality of through openings 32. As used herein, the term "groove" is understood to not completely extend through the sleeve 30, in contrast to the through openings 32. A depth of the grooves can be varied to optimize lubrication of the contact surfaces of the bearing components. The grooves 36a, 36b, 38a, 38b provide lubrication conduits for directing lubrication to contact surfaces of the housing 20 and the outer bearing ring 14.

Figure 1B:
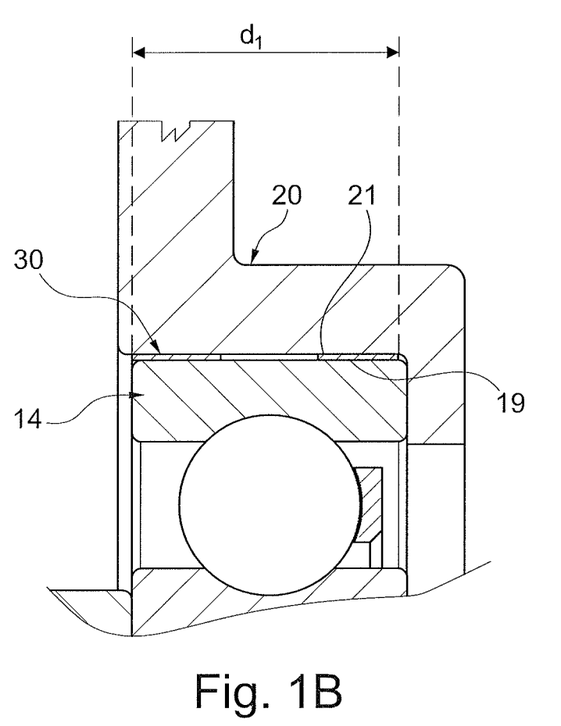
FIG. 1B is a magnified cross-sectional view of a housing, outer bearing ring and the sleeve of FIG. 1A.
Figure 1C:
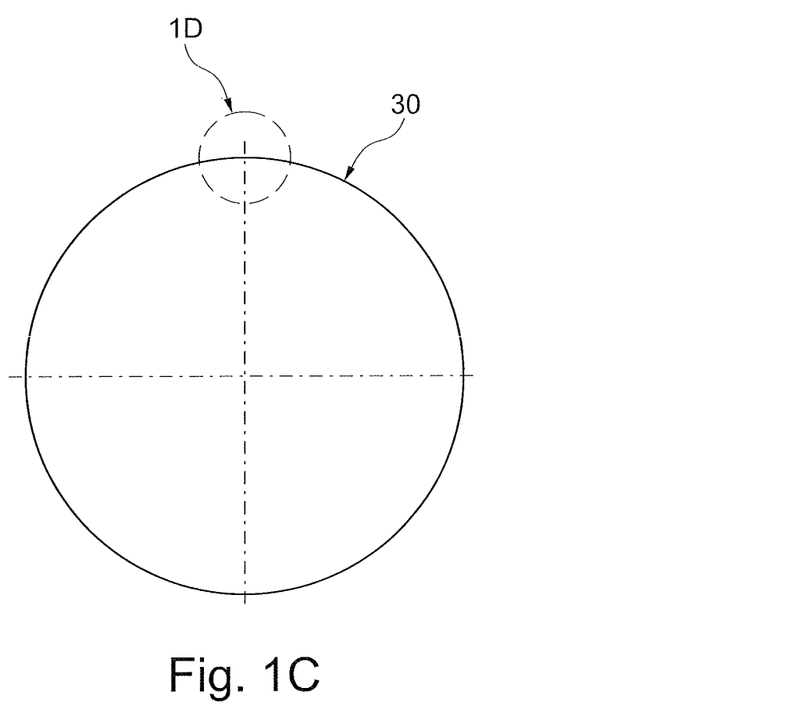
FIG. 1C is a side view of the sleeve of FIGS. 1A and 1B.

As shown in FIG. 1B, the sleeve 30 has an axial extent (dl) that extends a majority of the contact surfaces defined by the housing 20 and the outer bearing ring 14. More preferably, the sleeve 30 extends at least 90% of a contact surface defined by the outer bearing ring 14.

Figure 1D:
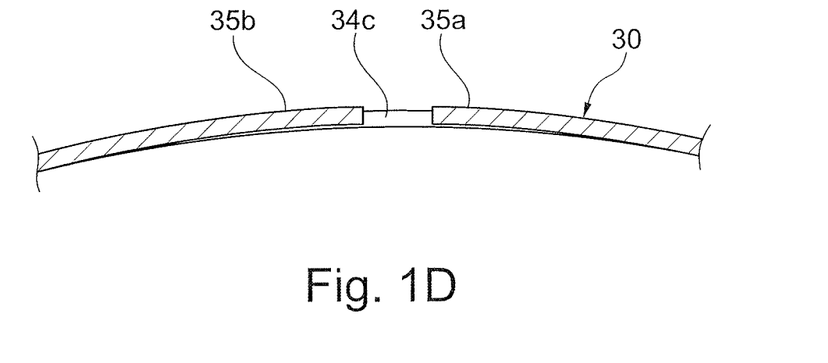
FIG. 1D is a magnified side view of the sleeve of FIG. 1C.
Figure 1E:
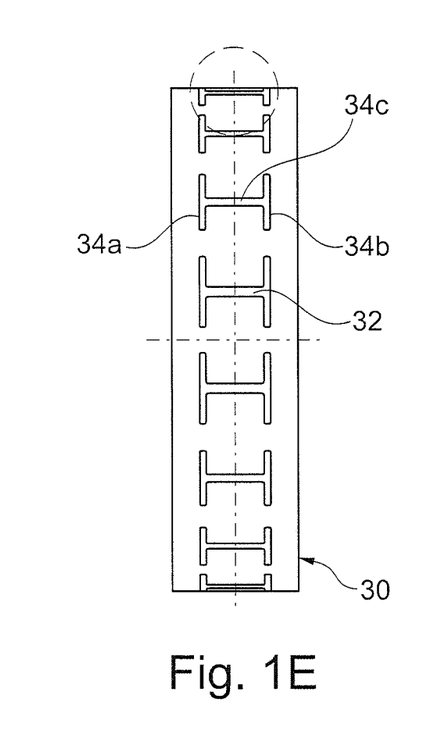
FIG. 1E is an end view of the sleeve of FIGS. 1A-1D.
Figure 1F:
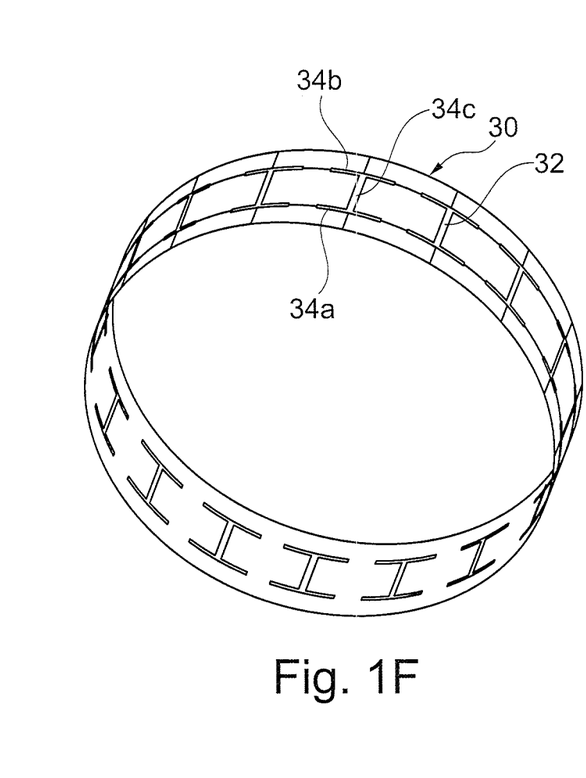
FIG. 1F is a perspective view of the sleeve of FIGS. 1A-1E.
Figure 1G:
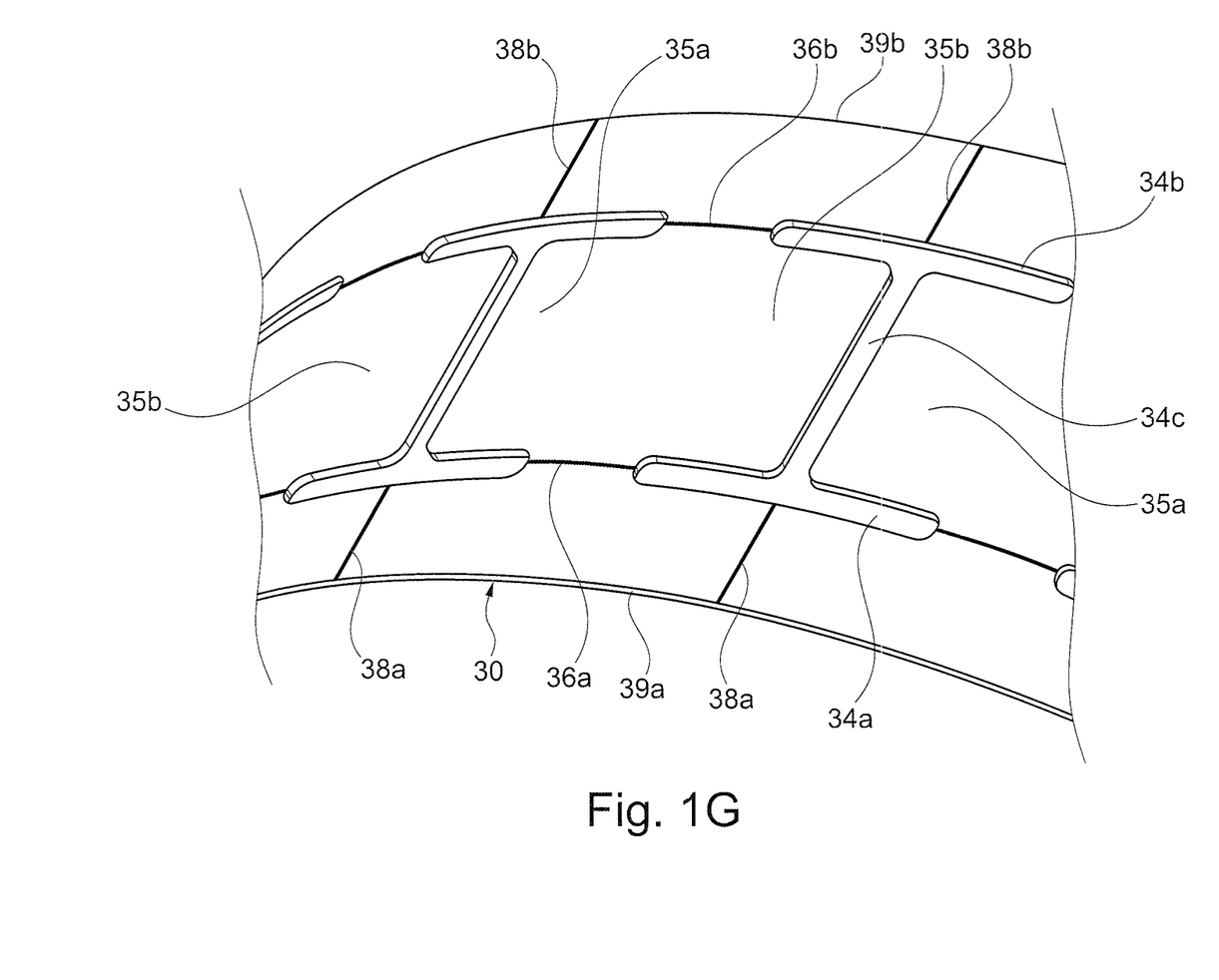
FIG. 1G is a magnified perspective view of the sleeve of FIGS. 1A-1F.

As shown in FIGS. 1D and 1G, a plurality of tabs 35a, 35b are defined by the sleeve 30. The tabs 35a, 35b are defined in an axially medial region of the sleeve 30 between adjacent pairs of the through openings 32. The tabs 35a, 35b can have a bent configuration relative to a circumferential direction, as best shown in FIG. 1D, to provide a biasing force. As shown in the drawings, the tabs 35a, 35b are bent radially outwardly. This configuration ensures proper contact of the sleeve 30 with the corresponding contact surfaces regardless of any thermal expansion of the housing 20.

In one embodiment, the sleeve 30 is press fit onto the outer bearing ring 14 and has a slip-fit relative to the housing 20. One of ordinary skill in the art would understand that various fits could be used to install the sleeve 30 between the outer bearing ring 14 and housing 20.

In one embodiment, the through openings 32 define a first area that is at least 15% of a total area of the sleeve 30. In one embodiment, the first area is 15%-33% of the total area of the sleeve 30. One of ordinary skill in the art would understand that the area of the through openings 32 can be varied depending on specific requirements for a particular application.

Figure 2A:
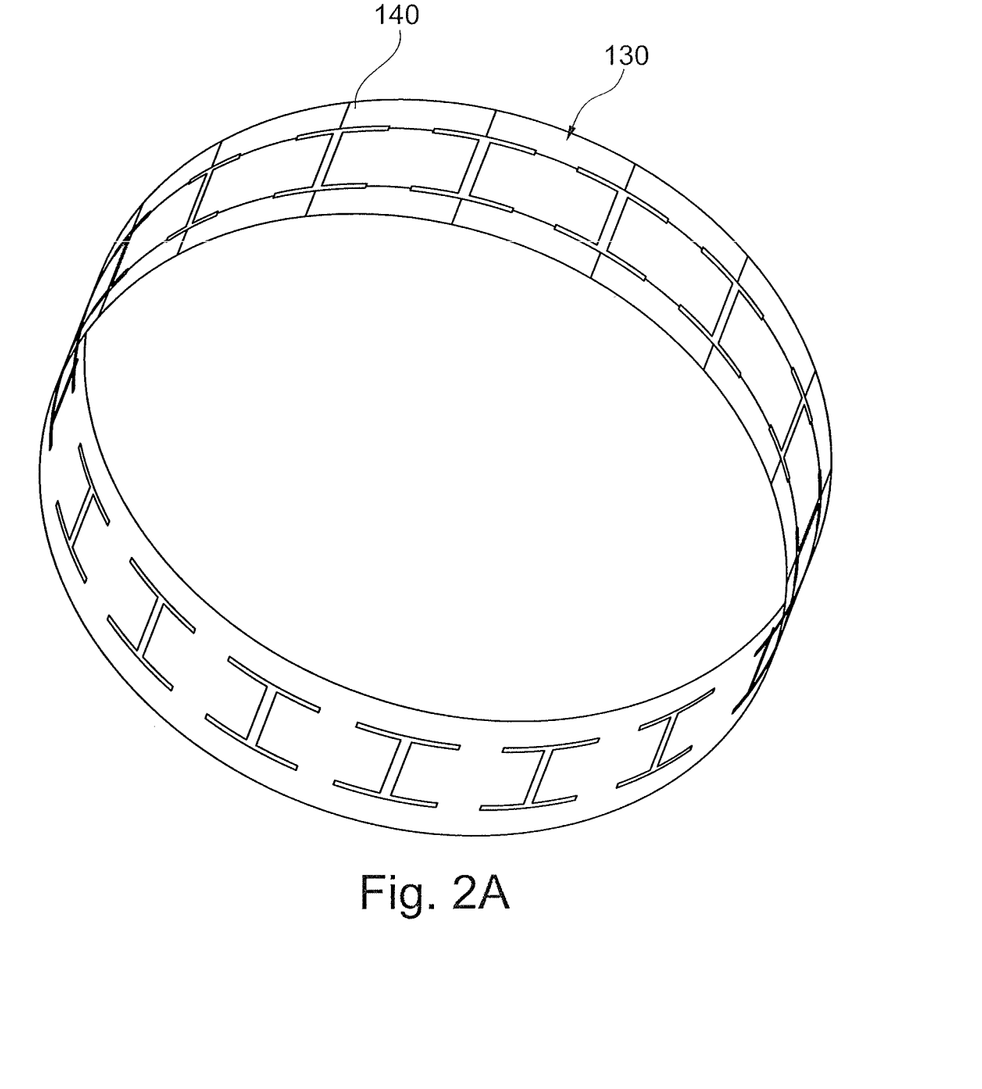
FIG. 2A is a perspective view of an alternative embodiment of a sleeve.
Figure 2B:
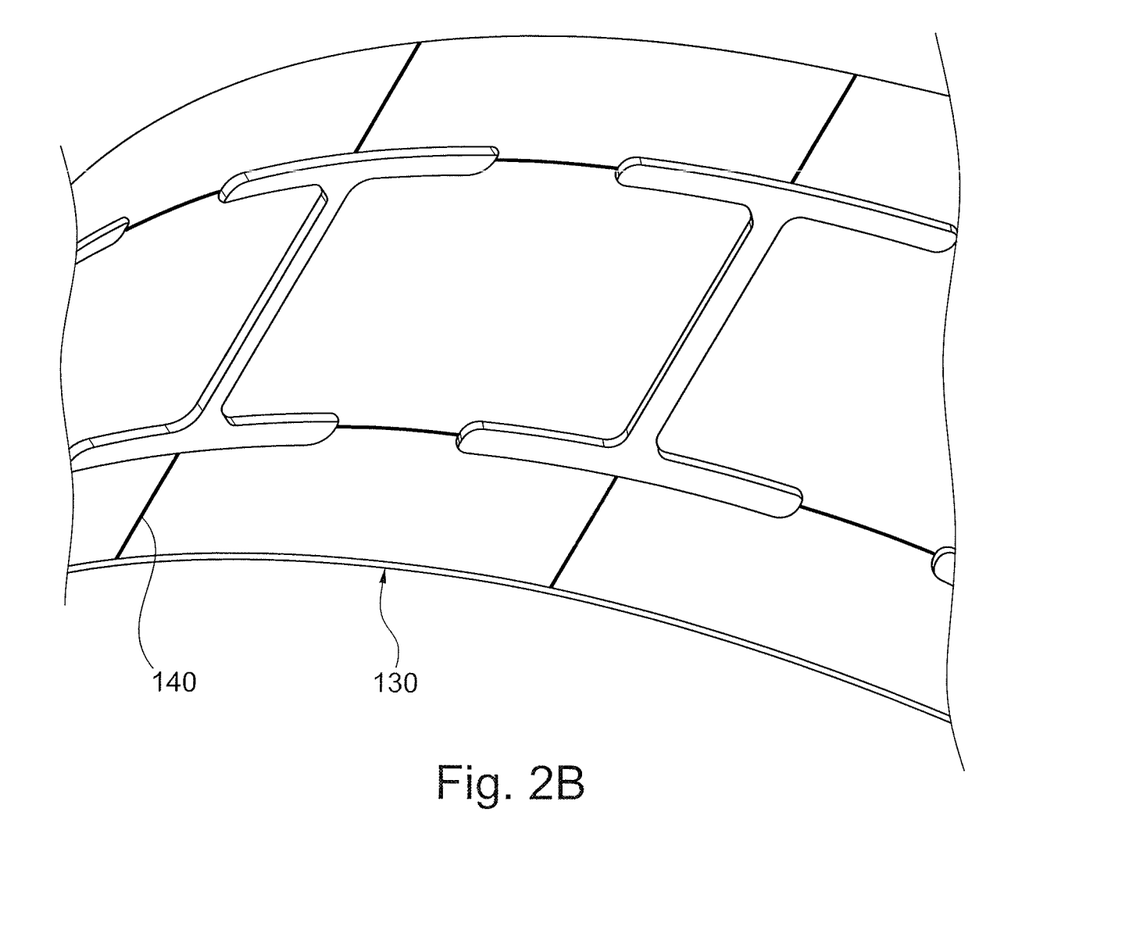
FIG. 2B is a magnified perspective view of the sleeve of FIG. 2A.
Figure 2C:
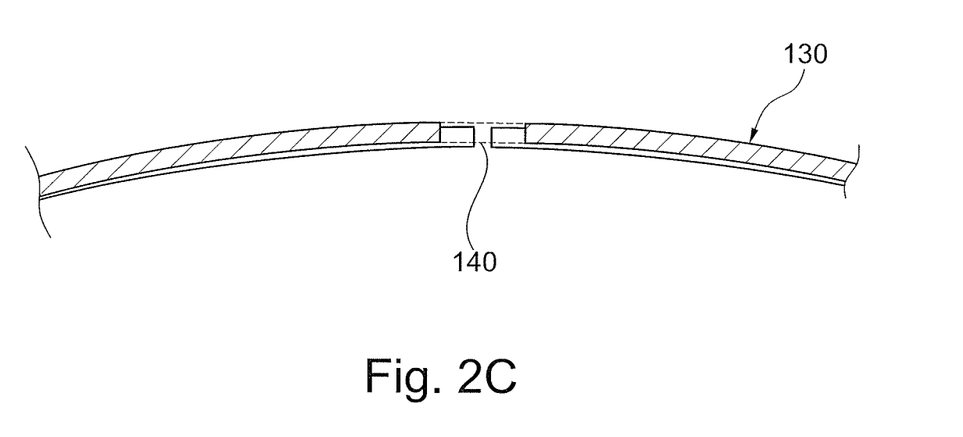
FIG. 2C is a side view of the sleeve of FIGS. 2A and 2B.

In another embodiment, shown in FIGS. 2A-2C, the sleeve 130 is a split ring, i.e. the sleeve 30 does not extend circumferentially for an entire 360 degrees. As shown in FIGS. 2A-2C, the sleeve 130 defines a split 140. The split 140 provides an alternative configuration in which the sleeve 130 does not need to be welded closed during installation, thereby simplifying installation.

The sleeve 30 generally provides the following advantages. The sleeve 30 reduces or completely stops creep of the outer bearing ring 14. The sleeve 30 also reduces housing 20 fretting and wear. In addition to preventing creep, the sleeve 30 provides an improved lubrication configuration due to the through openings 32 and grooves 36a, 36b, 38a, 38b, which help reduce fretting and wear. The relatively thin profile of the sleeve 30 also does not increase installation space.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

LOG OF REFERENCE NUMERALS

Deep groove ball bearing assembly 10
Inner bearing ring 12
Inner race 13
Outer bearing ring 14
Outer race 15
Rolling elements 16
Cage 17
Shaft 18
Radially outer surface 19 of the outer bearing ring
Housing 20
Radially inner surface 21 of the housing
Sleeve 30, 130
Through openings 32
Circumferentially extending slots 34a, 34b
Axially extending slot 34c
Tabs 35a, 35b
First plurality of grooves 36a, 36b
Second plurality of grooves 38a, 38b
Split 140

What is claimed is:

1. A deep groove ball bearing assembly comprising:
an inner bearing ring defining an inner race;
an outer bearing ring defining an outer race;
a plurality of rolling elements supported on the inner race and the outer race;
a shaft supported on a radially inner surface of the inner bearing ring;
a housing supported on a radially outer surface of the outer bearing ring; and
a sleeve arranged between the radially outer surface of the outer bearing ring and a radially inner surface of the housing, the sleeve including a plurality of through openings each having a predetermined, closed profile, the sleeve further including a plurality of grooves having at least one of:
(i) a first plurality of grooves extending circumferentially to connect adjacent through openings of the plurality of through openings; or
(ii) a second plurality of grooves extending axially to connect axially outermost edges of the sleeve and the plurality of through openings.

2. The deep groove ball bearing assembly of claim 1, wherein each through opening of the plurality of through openings includes a pair of circumferentially extending slots connected by an axially extending slot.

3. The deep groove ball bearing assembly of claim 1, wherein the plurality of grooves includes both the first plurality of grooves and the second plurality of grooves.

4. The deep groove ball bearing assembly of claim 1, wherein the sleeve is a closed ring.

5. The deep groove ball bearing assembly of claim 1, wherein the sleeve is a split ring.

6. The deep groove ball bearing assembly of claim 1, wherein the sleeve is a deep-drawn stamped sleeve.

7. The deep groove ball bearing assembly of claim 1, wherein the plurality of through openings each have an H-shaped profile.

8. The deep groove ball bearing assembly of claim 1, wherein the sleeve has an axial extent that extends a majority of each contact surface defined by the housing and the outer bearing ring.

9. The deep groove ball bearing assembly of claim 8, wherein the axial extent of the sleeve extends at least 90% of an axial extent of the contact surface defined by the outer bearing ring.

10. The deep groove ball bearing assembly of claim 1, wherein the sleeve includes a plurality of tabs defined between adjacent pairs of through openings of the plurality of through openings, and the plurality of tabs each have a bent configuration relative to a circumferential direction.

11. The deep groove ball bearing assembly of claim 1, wherein the plurality of through openings define a first area that is at least 15% of a total area of the sleeve.

12. A sleeve for a deep groove ball bearing assembly, the sleeve comprising:
- a circular ring body defining a plurality of through openings,
- each through opening of the plurality of through openings has a H-shaped profile and includes a pair of circumferentially extending slots connected by an axially extending slot,
- the sleeve further including:
  - a first plurality of grooves extending circumferentially to connect adjacent through openings of the plurality of through openings, and
  - a second plurality of grooves extending axially to connect axially outermost edges of the sleeve and the plurality of through openings.

13. The sleeve of claim 12, the sleeve further including a plurality of tabs defined between adjacent pairs of through openings of the plurality of through openings, and the plurality of tabs each have a bent configuration relative to a circumferential direction.

14. The sleeve of claim 12, wherein the sleeve is a closed ring.

15. The sleeve of claim 12, wherein the sleeve is a split ring.

16. The sleeve of claim 12, wherein the sleeve is a deep-drawn stamped sleeve.

* * * * *